United States Patent [19]

Bokerman et al.

[11] Patent Number: 5,317,072

[45] Date of Patent: May 31, 1994

[54] CONDENSATION PROCESS FOR PREPARATION OF ORGANOFUNCTIONAL SILOXANES

[75] Inventors: Gary N. Bokerman, Midland, Mich.; David E. Puckett, Taylor Mill; Larry H. Wood, Campbellsburg, both of Ky.

[73] Assignee: Dow Corning Corporation, Midland, Mich.

[21] Appl. No.: 922,886

[22] Filed: Jul. 31, 1992

[51] Int. Cl.$^5$ .............................................. C08G 77/06
[52] U.S. Cl. ..................................... 528/12; 556/462; 556/466; 556/489; 528/34
[58] Field of Search ................... 528/34, 12; 556/462, 556/466, 489

[56] References Cited

U.S. PATENT DOCUMENTS

| | | | |
|---|---|---|---|
| 2,421,653 | 6/1947 | Sauer. | |
| 2,779,776 | 1/1951 | Hyde. | |
| 3,078,255 | 2/1963 | Pike | 528/34 |
| 3,169,942 | 2/1965 | Pike | 524/34 |
| 4,218,359 | 8/1980 | Marwitz et al. | 524/34 |

Primary Examiner—Melvyn I. Marquis
Attorney, Agent, or Firm—William F. Boley

[57] ABSTRACT

The present invention is a process for the preparation of organofunctional-terminated polydiorganosiloxane polymers and organofunctional polydiorganosiloxane copolymers. The process comprises reacting a hydroxyl-terminated polydiorganosiloxane polymer with: (1) an organofunctional chlorosilane end-blocker to form an organofunctional terminated polydiorganosiloxane polymer and (2) a mixture of organochlorosilane end-blocker and organofunctional dichlorosilane to form an organofunctional polydiorganosiloxane copolymer. The process can be conducted in the presence of an aqueous solution of hydrogen chloride, where the water is present in stoichiometric excess in relation to the hydrolyzable silicon-bonded chlorine.

The present process is particularly useful for producing 5-hexenyl-terminated polydimethylsiloxane polymers and for producing siloxane copolymers comprising poly-5-hexenylmethylsiloxy and polydimethylsiloxy blocks.

25 Claims, No Drawings

CONDENSATION PROCESS FOR PREPARATION OF ORGANOFUNCTIONAL SILOXANES

BACKGROUND OF INVENTION

The present invention is a condensation process for the preparation of organofunctional-terminated polydiorganosiloxane polymers and organofunctional polydiorganosiloxane copolymers. The process comprises reacting a hydroxyl-terminated polydiorganosiloxane polymer with (1) an organofunctional chlorosilane end-blocker to form the organofunctional-terminated polydiorganosiloxane polymer or (2) a mixture of an organochlorosilane end-blocker and an organofunctional dichlorosilane to form a organofunctional polydiorganosiloxane copolymer. The process is facilitated by conducting it in the presence of an aqueous solution of hydrogen chloride, where the water is present in a stoichiometric excess in relation to the hydrolyzable silicon-bonded chlorine.

Organofunctional-terminated polydiorganosiloxane polymers and organofunctional polydiorganosiloxane copolymers, particularly where the organofunctional group is an alkenyl are finding increasing use as paper coatings. However, the use of these materials is limited by the costs of production associated with current processes. For example, current equilibrium processes result in the production of undesirable volatile cyclic species which must be stripped from the product using high temperature and reduced pressures. The present condensation process results in very low residual volatile cyclics, thus no stripping is typically required. Therefore, the present process is a simple one-step non-equilibrium process using readily available materials, thus reducing the cost of production of these organofunctional siloxane polymers and siloxane copolymers.

Several methods for the production of chlorine-terminated polydiorganosiloxane polymers are known. For example, it is known that the hydrolysis and condensation of diorganodichlorosilanes can result in a mixture of cyclicdiorganosiloxanes and short-chained chlorine end-terminated polydiorganosiloxanes, with the concurrent formation of hydrogen chloride.

Sauer, U.S. Pat. No. 2,421,653, issued Jun. 3, 1947, teaches that polydiorganosiloxanes can be equilibrated with organodihalosilanes in the presence of an aqueous hydrogen chloride solution to form chlorine end terminated polydiorganosiloxanes.

Hyde et al., U.S. Pat. No. 2,779,776, issued Jan. 29, 1957, teaches that polydiorganosiloxane polymers can be equilibrated in the presence of an aqueous solution of hydrogen chloride to form chlorine-terminated polydiorganosiloxanes. Furthermore, Hyde et al., teaches that the chain length of the chlorine-terminated polydiorganosiloxanes is a function of the hydrogen chloride concentration in the aqueous phase.

These chlorine-terminated polydiorganosiloxane polymers can be further hydrolyzed with excess water to form hydroxyl-terminated polydiorganosiloxane polymers suitable for use in the present process.

In a first embodiment of the present process, a hydroxyl-terminated polydiorganosiloxane polymer is reacted with a organochlorosilane end-blocker containing at least one organofunctional substituent. The resultant product is an organofunctional-terminated polydiorganosiloxane polymer.

In a second embodiment of the present process, a hydroxyl-terminated polydiorganosiloxane polymer is reacted with a mixture comprising an organochlorosilane end-blocker and an organofunctional dichlorosilane. The resultant product is a block copolymer comprising diorganosiloxy blocks and organofunctionalsiloxy blocks.

The cited art does not recognize that hydroxyl terminated polydiorganosiloxane polymers can be reacted, as described in the present process, to form organofunctional terminated polydiorganosiloxanes and organofunctional polydiorganosiloxane copolymers

SUMMARY OF INVENTION

The present invention is a process for the preparation of organofunctional-terminated polydiorganosiloxane polymers and organofunctional polydiorganosiloxane copolymers. The process comprises reacting a hydroxyl-terminated polydiorganosiloxane polymer with: (1) an organofunctional chlorosilane end-blocker to form an organofunctional terminated polydiorganosiloxane polymer or (2) a mixture of organochlorosilane end-blocker and organofunctional dichlorosilane to form an organofunctional polydiorganosiloxane copolymer. The process can be facilitated by the presence of an aqueous solution of hydrogen chloride, where the water is present in stoichiometric excess in relation to the hydrolyzable silicon-bonded chlorine The present process is particularly useful for producing 5-hexenyl-terminated polydimethylsiloxane polymers and for producing siloxane copolymers comprising poly-5-hexenylmethylsiloxy and polydimethylsiloxy blocks.

DESCRIPTION OF INVENTION

The present invention is a process for the preparation of organofunctional-terminated polydiorganosiloxane polymers described by formula

    (1)

and organofunctional polydiorganosiloxane copolymers described by formula

    (2)

where each R is a radical selected from a group consisting of alkyls of one to 20 carbon atoms, cycloalkyls comprising four to 20 carbon atoms, and aryls; $R^1$ is an organofunctional radical selected from a group consisting of alkenyls comprising two to 20 carbon atoms and haloalkyls comprising one to 20 carbon atoms; a=1, 2, or 3; b=0, 1, or 2; a+b=3; c=1 or 2; d=0 or 1; c+d=2; e=0, 1, 2, or 3; f=0, 1, 2, or 3; e+f=3; x is an integer from n+1 to 1,000; n is an integer from one to 999; q is an integer from one to 1,000; y is the number of diorganosiloxy blocks contained in the copolymer and y is an integer from one to 1,000; and z is the number of organofunctionalsiloxy blocks contained in the copolymer and z is an integer from one to 1,000; A preferred organofunctional polydiorganosiloxane copolymer is one where q=1.

To form the organofunctional-terminated polydiorganosiloxane polymers described by formula (1), a first embodiment of the present process comprises: (A) forming a mixture comprising hydroxyl-terminated polydiorganosiloxane polymers described by formula $$HO(R_2SiO)_nSiR_2OH, \quad (3)$$

and an organofunctional chlorosilane end blocker described by formula $$R^1{}_aR_bSiCl; \text{ and} \quad (4)$$

(B) isolating organofunctional-terminated polydiorganosiloxane polymers described by formula (1); where R, $R^1$, a, b, and n are as previously described.

To form the organofunctional polydiorganosiloxane copolymers described by formula (2), a second embodiment of the present process comprises:

(A) forming a mixture comprising hydroxyl-terminated polydiorganosiloxane polymers of the formula (3), that is $$HO(R_2SiO)_nSiR_2OH,$$

an organofunctional dichlorosilane described by formula $$R^1{}_cR_dSiCl_2, \quad (5)$$

and an organochlorosilane end-blocker of formula $$R^1{}_eR_fSiCl; \text{ and} \quad (6)$$

(B) isolating organofunctional polydiorganosiloxane copolymers, as described by formula (2), comprising diorganosiloxy blocks of formula $(R_2SiO)_x$ and organofunctionalsiloxy blocks of formula $(R^1{}_cR_dSiO)_q$, where R, $R^1$, c, d, e, f, x, q, and n are as previously described.

The present process can be run in any standard reactor suitable for reacting chlorosilanes. The present process can be run as a continuous, semi-continuous, or batch process. The present process employs hydroxyl-terminated polydiorganosiloxane polymers, as described by formula (3), as the basic building unit for the process. The hydroxyl terminated polydiorganosiloxane polymers contain substituents R where each R is a radical independently selected from the group consisting of alkyls comprising one to 20 carbon atoms, cycloalkyls comprising four to 20 carbon atoms, and aryls. R can be, for example, methyl, ethyl, propyl, butyl, isobutyl, tert-butyl, pentyl, hexyl cyclopentyl, cyclohexyl, phenyl, tolyl, and xylyl. Preferred is when R is methyl. More preferred is when R is methyl and n is an integer from 1 to 50.

In the embodiment of the present process where the product is an organofunctional-terminated polydiorganosiloxane polymer as described by formula (1), a mixture of the hydroxyl-terminated polydiorganosiloxane polymer is formed with an organofunctional chlorosilane end-blocker as described by formula (4). The organofunctional chlorosilane end-blocker can have one, two, or three organofunctional radical substituents $R^1$. $R^1$ is selected from a group consisting of alkenyls comprising two to 20 carbon atoms and haloalkyl radicals comprising one to 20 carbon atoms. $R^1$ can be, for example, vinyl, allyl, 1-methylvinyl, 4-pentenyl, 2-pentenyl, 5-hexenyl, bromomethyl, chloromethyl, iodomethyl, fluoromethyl, 3,3,3-trifluoropropyl, and perfluoropropyl. Preferred is where $R^1$ is selected from a group consisting of alkenyls comprising two to 10 carbon atoms. More preferred is where $R^1$ is vinyl or 5-hexenyl. The organofunctional chlorosilane end-blocker can have zero, one, or two radicals R, where R is as previously described. The preferred organofunctional chlorosilane end-blocker is one containing two substituents R, where R is methyl and $R^1$ is an alkenyl of two to 10 carbon atoms. The most preferred organofunctional chlorosilane end-blockers are 5-hexenyldimethylchlorosilane and dimethylvinylchlorosilane.

In the second embodiment of the present process where the product is an organofunctional polydiorganosiloxane copolymer as described by formula (2), a mixture of the hydroxyl-terminated polydiorganosiloxane polymer with an organochlorosilane end-blocker as described by formula (6) is formed. The organochlorosilane end-blocker can have zero, one, two, or three substituents $R^1$, where $R^1$ is as previously described. The organochlorosilane end-blocker can have zero, one, two, or three substituents R, where R is as previously described. The total of R substituents and $R^1$ substituents bonded to the silicon atom of the organochlorosilane end-blocker must equal three. Preferred is when the organochlorosilane end-blocker is selected from a group consisting of trimethylchlorosilane, 5-hexenyldimethylchlorosilane, and dimethylvinylchlorosilane.

A useful concentration of the organofunctional chlorosilane end-blocker of formula (4) and the organochlorosilane end-blocker of formula (6) is where the mole ratio of the hydroxyl-terminated polydiorganosiloxane polymer described by formula (3) to end-blocker is within a range of about 0.5 to 999. A preferred concentration for end-blocker is where the mole ratio of hydroxyl-terminated polydiorganosiloxane polymer to end-blocker is within a range of about 0.5 to 10.0. The mole ratio at which the hydroxyl terminated polydiorganosiloxane polymer and end-blocker are controlled in the mixture will depend upon the desired chain length for the product polymers and copolymers. Generally, the larger the ratio of hydroxyl-terminated polydiorganosiloxane polymer to end-blocker, the larger the molecular weight of the product polymers and copolymers.

In the second embodiment of the present process, where the product is an organofunctional polydiorganosiloxane copolymer as described by formula (2), a mixture of hydroxyl-terminated polydiorganosiloxane polymer and organochlorosilane end-blocker also contains an organofunctional dichlorosilane as described by formula (5). The organofunctional dichlorosilane can contain one or two substituents $R^1$, where $R^1$ is an organofunctional radical as previously described: and zero or one substituent R, where R is as previously described. The preferred organofunctional dichlorosilane is where $R^1$ is an alkenyl comprising two to 10 carbon atoms and R is methyl. Even more preferred is when the organofunctional dichlorosilane is 5-hexenylmethyldichlorosilane or methylvinyldichlorosilane.

A useful concentration of the organofunctional dichlorosilane, as described by formula (5), is where the mole ratio of the hydroxyl-terminated polydiorganosiloxane polymers described by formula (1), to organofunctional dichlorosilane, is within a range of about 0.5 to 1000. It is preferred that the mole ratio of hydroxyl-terminated polydiorganosiloxane polymer to organofunctional dichlorosilane be within a range of about 0.5 to 5.0.

The mixture comprising either (1) the hydroxyl terminated polydiorganosiloxane polymer and the organofunctional chlorosilane end-blocker; or (2) the hydroxyl-terminated polydiorganosiloxane polymer, the organofunctional dichlorosilane, and the organochlorosilane end-blocker; may be contacted with a stoichiometric excess of water containing 5 to 36 weight percent hydrogen chloride.

By "stoichiometric excess" it is meant that the mole ratio of water to total silicon-bonded chloride is greater than 0.5. Generally, the greater the excess of water the faster the reaction, however, excess water may cause formation of cyclosiloxanes. Therefore, in practice, the mole ratio of water to silicon-bonded chloride is dictated by the size of the reaction vessel, desired reaction rate, and acceptable levels of cyclosiloxanes. A useful mole ratio of water to silicon-bonded chloride is within a range of greater than about 0.5 to 200. A preferred mole ratio of water to silicon-bonded chloride is within a range of about one to 100. The most preferred molar ratio of water to silicon-bonded chloride is within a range of about 4 to 40.

Hydrogen chloride, present in aqueous solution, can act as a catalyst for the present process. Therefore, it is desirable to maintain the aqueous concentration of hydrogen chloride in the present process within a range of about 5 to 36 weight percent. The water added to the process may contain 5 to 36 weight percent hydrogen chloride as added or alternatively water may be added to the process and the 5 to 36 weight percent hydrogen chloride be created in situ by the hydrolysis of silicon bonded chloride. A preferred range for the concentration of hydrogen chloride in water is about 10 to 32 weight percent. The most preferred range for the concentration of hydrogen chloride in water is about 25 to 32 weight percent.

The described mixtures are immiscible with the aqueous hydrogen chloride. Therefore, it is desirable to facilitate contact between the mixture phase and the aqueous phase by a dispersive means. The dispersive means can be, for example, mechanical stirring, sonification, agitation of the reactor, high pressure injection, or impingement mixing.

The temperature at which the process is conducted can be any temperature within a range where the lower limit is defined by the freezing point of the aqueous hydrogen chloride solution and the upper limit determined by the point where significant cleavage of organic substituents from silicon occurs. In general, a temperature within a range of about 0° C. to 100° C. may be used. A preferred temperature for conducting the process is within a range of about 20° C. to 50° C.

The pressure within the reactor in which the process is run can be within a range of about 0.1 to ten atmospheres. About one atmosphere is a preferred pressure.

The time of contact of the mixtures with the aqueous hydrogen chloride is not critical to the present process. In general any contact time within a range of about 0.1 hour to 18 hours is considered useful. A preferred contact time is within a range of about 0.5 hour to four hours.

Isolation of the organofunctional-terminated polydiorganosiloxane polymers and isolation of the organofunctional polydiorganosiloxane copolymers can be achieved by standard means. Isolation may consist merely of suitably storing the siloxane polymers and siloxane copolymers for subsequent use. The siloxane polymers and the siloxane copolymers can be separated from aqueous hydrogen chloride by, for example, stripping gravitational settling, centrifugation, coalescence or membrane separation.

Typically the recovered product siloxane polymers and product siloxane copolymers are contaminated with materials containing silicon-bonded to chlorine. To ensure the stability of the recovered products, it may be desirable to wash the recovered products with one or more portions of water to hydrolyze and remove the residual chlorine.

The following example is offered to illustrate the present invention. This example is not intended to limit the present claims.

EXAMPLE

A copolymer of polydimethylsiloxane with pendant and terminal 5-hexenyl groups was prepared. The preparation apparatus was a 250 mL flask containing a magnetic stirring bar. A charge comprising 99.97 g of HO(Me$_2$SiO)$_n$SiMe$_2$OH (where n had a value of about 39), 5.4 g of 5-hexenylmethyldichlorosilane, and 3.2 g of 5-hexenyldimethylchlorosilane was placed in the flask. The content of the flask was stirred for 2 hours. The resultant fluid was washed with water, separated from the water, and residual water boiled off while purging with nitrogen. The product was analyzed for residual chlorine by acid/base titration, for molecular weight by gel permeation chromatography and for vinyl content by Fourier Transform Infrared (FTIR) analysis. The product fluid had 75 ppm chlorine, 0.88 weight percent vinyl, and an Mn of 8398.

We claim:

1. A process for preparation of organofunctional terminated polydiorganosiloxane polymers, the process comprising:

(A) forming a mixture comprising a hydroxyl-terminated polydiorganosiloxane polymer described formula HO(R$_2$SiO)$_n$SiR$_2$OH, where each R is a radical independently selected from a group consisting of alkyls comprising one to 20 carbon atoms, cycloalkyls comprising 4 to 20 carbon atoms, and aryls, and n is an integer from one to 999; and an organofunctional chlorosilane end-blocker described by formula R$^1_a$R$_b$SiCl, where each R$^1$ is an organofunctional radical independently selected from a group consisting of alkenyls comprising two to 20 carbon atoms and haloalkyl radicals comprising one to 20 carbon atoms, R is as previously described, a=1, 2, or 3, b=0, 1, or 2, and a+b=3;

(B) contacting the mixture with a stoichiometric excess of water containing 5 to 36 weight percent hydrogen chloride; and (C) isolating organofunctional-terminated polydiorganosiloxane polymers described by formula R$^1_a$R$_b$SiO(R$_2$SiO)$_x$SiR$^1_a$R$_b$, where R, R$^1$, a, and b are as previously described and x is an integer from n+1 to 1,000.

2. A process according to claim 1, where R is methyl.

3. A process according to claim 1, where n is an integer from 1 to 50.

4. A process according to claim 1, where $R^1$ is selected from a group consisting of alkenyls of two to 10 carbon atoms.

5. A process according to claim 1, where $R^1$ is selected from a group consisting of vinyl and 5-hexenyl.

6. A process according to claim 1, where the organofunctional chlorosilane end-blocker is selected from a group consisting of 5-hexenyldimethylchlorosilane and dimethylvinylchlorosilane.

7. A process according to claim 1, where the mole ratio of the hydroxyl-terminated polydiorganosiloxane polymer to the organofunctional chlorosilane end-blocker is within a range of about 0.5 to 10.0.

8. A process according to claim 1, where the process is conducted at a temperature within a range of about 20° C. to 50° C.

9. A process according to claim 1, where the mixture is maintained at a temperature within a range of about 20° C. to 50° C. for a time period within a range of about 0.1 to 18 hours.

10. A process according to claim 1, where the mixture is maintained at a temperature within a range of about 20° C. to 50° C. for a time period within a range of about 0.5 to four hours.

11. A process according to claim 1, where the isolated organofunctional-terminated polydiorganosiloxane polymers are washed with one or more portions of water.

12. A process for preparation of organofunctional polydiorganosiloxane copolymers, the process comprising:

(A) forming a mixture comprising a hydroxyl-terminated polydiorganosiloxane polymer described by formula $$HO(R_2SiO)_nSiR_2OH,$$

where each R is a radical independently selected from a group consisting of alkyls comprising one to 20 carbon atoms, cycloalkyls comprising four to 20 carbon atoms, and aryls, and n is an integer from one to 999; a organofunctional dichlorosilane of formula $$R^1_cR_dSiCl_2,$$

where each $R^1$ is an organofunctional radical independently selected from a group consisting of alkenyls comprising two to 20 carbon atoms and haloalkyls comprising one to 20 carbon atoms, R is as previously described, c=1 or 2, d=0 or 1, and c+d=2; and a organochlorosilane end-blocker of formula $$R^1_eR_fSiCl,$$

where R and $R^1$ are as previously described, e=0, 1, 2, or 3 f=0, 1, 2, or 3, and e+f=3; and (B) isolating organofunctional polydiorganosiloxane copolymers described by formula $$R^1_eR_fSiO\{(R_2SiO)_x\}_y\{(R^1_cR_dSiO)_q\}_zSiR^1_eR_f,$$

where R, $R^1$, c, d, e, and f are as previously described, x is an integer from n+1 to 1,000, q is an integer from one to 1,000, y is an integer from one to 1,000, and z is an integer from one to 1,000.

13. A process according to claim 12, where R is methyl.

14. A process according to claim 12, where n is an integer from 1 to 50.

15. A process according to claim 12, where $R^1$ is selected from a group consisting of alkenyls comprising two to 10 carbon atoms.

16. A process according to claim 12, where $R^1$ is selected from a group consisting of vinyl and 5-hexenyl.

17. A process according to claim 12, where the organochlorosilane end-blocker is selected from a group consisting of 5 hexenyldimethylchlorosilane, dimethylvinylchlorosilane, and trimethylchlorosilane.

18. A process according to claim 12, where the mole ratio of the hydroxyl-terminated polydiorganosiloxane polymer to the organochlorosilane end-blocker is in a range of about 0.5 to 10.0.

19. A process according to claim the process is conducted at a temperature within a range of about 20° C. to 50° C.

20. A process according to claim 12, where the mixture is maintained at a temperature within a range of about 2° C. to 50° C. for a time period within a range of about 0.1 to 18 hours.

21. A process according to claim 12, the mixture is maintained at a temperature within a range of about 20° C. to 50° C. for a time period within a range of about 0.5 to four hours.

22. A process according to claim 12, where the isolated organofunctional polydiorganosiloxane copolymers are washed with one or more portions of water.

23. A process according to claim 12, where the mole ratio of the hydroxyl-terminated polydiorganosiloxane to organofunctional dichlorosilane is within a range of about 0.5 to 5.0.

24. A process according to claim 1, where R is methyl, n=1 to 50, the organofunctional chlorosilane end-blocker is selected from a group consisting of -5hexenyldimethylchlorosilane, and dimethylvinylchlorosilane, the mole ratio of hydroxyl-terminated polydiorganosiloxane polymer to the organofunctional chlorosilane end blocker is within a range of about 0.5 to 10 and the process is conducted at a temperature within a range of about 20° C. to 5° C.

25. A process according to claim 12, where R is methyl n=1 to 50, the organochlorosilane end-blocker is selected from a group consisting of 5-hexenyldimethylchlorosilane, dimethylvinylchlorosilane, and trimethylchlorosilane, the mole ratio of hydroxyl-terminated polydiorganosiloxane polymer to the organochlorosilane end-blocker is within a range of about 0.5 to 10. the mole ratio of hydroxyl-terminated polydiorganosiloxane polymer to organofunctional dichlorosilane is within a range of about 0.5 to 5.0, and the process is conducted at a temperature within a range of about 20° C. to 50° C.

* * * * *